United States Patent
Groeneveld et al.

(10) Patent No.: US 6,600,300 B2
(45) Date of Patent: Jul. 29, 2003

(54) DIGITALLY CONTROLLED DC/DC CONVERTER

(75) Inventors: Dirk Wouter Johannes Groeneveld, Nijmegen (NL); Ferdinand Jacob Sluijs, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/055,381

(22) Filed: Jan. 22, 2002

(65) Prior Publication Data

US 2002/0105307 A1 Aug. 8, 2002

(30) Foreign Application Priority Data

Jan. 23, 2001 (EP) .............................................. 01200236

(51) Int. Cl.[7] ............................. G05F 1/40; G05F 1/577
(52) U.S. Cl. ........................ 323/282; 323/222; 323/267
(58) Field of Search ................................. 323/222, 273, 323/282, 267, 283

(56) References Cited

U.S. PATENT DOCUMENTS

| | | | | |
|---|---|---|---|---|
| 5,506,493 A | * | 4/1996 | Stengel | 323/223 |
| 5,945,820 A | | 8/1999 | Namgoong et al. | 323/282 |
| 6,163,143 A | | 12/2000 | Shimamori | 323/284 |
| 6,222,352 B1 | * | 4/2001 | Lenk | 323/267 |
| 6,320,358 B2 | * | 11/2001 | Miller | 323/222 |
| 6,404,174 B1 | * | 6/2002 | Boudreaux et al. | 323/273 |

FOREIGN PATENT DOCUMENTS

WO        9534121 A1    12/1995

* cited by examiner

*Primary Examiner*—Adolf D. Berhane
(74) *Attorney, Agent, or Firm*—Laurie E. Gathman

(57) ABSTRACT

A DC/DC converter (1; 20), comprising inductive electrical energy storage means (L), switching means (S1–S4) and means (6; 15) wherein said control means (6; 15) are arranged for selectively operating said switching means (S1–S4) for transferring an amount of electrical energy from said energy storage means (L) to an output of said DC/DC converter (1; 20), for providing a desired output voltage (Vout), characterized by digital control means (6; 15) which are configured for operatively controlling said switching means (S1–S4) for transferring electrical energy in accordance with a switching sequence comprising a ramp-up switching cycle and a ramp-down cycle for substantially charging and discharging of the energy storage means (L).

20 Claims, 3 Drawing Sheets

DIGITALLY CONTROLLED DC/DC CONVERTER

This application claims priority to European Patent Application No. 01200236.6 filed Jan. 23, 2001.

FIELD OF THE INVENTION

The present invention relates to a DC/DC converter comprising inductive electrical energy storage means, switching means and control means wherein said control means are arranged for selectively operating said switching means for transferring an amount of electrical energy from said energy storage means to an output of said DC/DC converter, for providing a desired output voltage.

BACKGROUND OF THE INVENTION

A DC/DC converter of this type is known from International patent application WO 95/34121 in the name of applicant.

In practice, a DC/DC converter of the above type can be operated in a continuous or PWM (Pulse Width Modulation) mode, wherein electrical energy is continuously stored in the energy storage means, or in the discontinuous or PFM (Pulse Frequency Modulation) mode, wherein the energy storage means may be completely discharged.

In a single output DC/DC converter operated in PWM mode, a typical switching cycle comprises a first phase wherein the switching means are controlled for storing energy in the energy storage means, and a second phase wherein the switching means are controlled for transferring energy from the energy storage means to the output of the converter. The output power of a DC/DC converter operated in PWM mode is controlled by its duty cycle, which is the ratio of the length in time of the first phase and the total length in time of the switching cycle, i.e. the sum of the first and second phases.

For a digitally controlled DC/DC converter the length of the phases is defined by numbers which are derived from a counter running on a fixed clock frequency. Accordingly, the duty cycle is quantised, such that there is a limited number of possible duty cycles. Dependent on the clock frequency and the switching frequency of the converter, N different numbers of duty cycles can be provided, running from zero through 1/N, 2/N till N/N, i.e. 1. Accordingly, the duty cycles may only very in discrete steps. It will be appreciated that there is a control problem if, starting from an unknown input voltage, an exact defined output voltage has to be provided.

In the above-mentioned prior art document, this control problem is solved by allowing some variation in the output voltage, which may very within a voltage window. However, this solution has as a draw-back in that the accuracy of the output voltage is decreased, while the output voltage may continuously very.

As an alternative, the duty cycle of the converter can be stepwise varied, whether the output voltage is above or below a set reference voltage. However, this type of control is rather slow, resulting in a too large instability, such that the duty cycle and the output voltage may vary substantial very continuously. To solve this problem, a waiting time can be introduced between the adaptation of the duty cycle and a next measurement of the output voltage, however this too increases the slowness of the control.

SUMMARY OF THE INVENTION

It is an object of the present invention to provide a DC/DC converter of the above-mentioned time, which does not suffer from strong variations in the duty cycle, however anticipating very quickly to variations in the output voltage of the converter.

This object is solved in a DC/DC converter according to the present invention, characterized by digital control means which are configured for operatively controlling the switching means for transferring electrical energy in accordance with a switching sequence comprising a ramp-up switching cycle and a ramp-down switching cycle for substantially charging and decharging of the energy storage means.

In accordance with the present invention, the duty cycle of a switching cycle is adopted such that the amount of electrical energy stored in the energy storage means is substantially increased or decreased, dependent whether the output voltage is below or above its reference voltage, respectively.

As a consequence, the output voltage of the DC/DC converter will be substantially higher or lower than the reference voltage.

In a preferred embodiment of the invention, the control means are arranged for comparing the output voltage with a reference voltage, and wherein the switching means are controlled such that if the output voltage is below said reference voltage, a ramp-up switching cycle is used as a next switching cycle, and if the output voltage is higher than the reference voltage a ramp-down switching cycle is used as a next switching cycle.

After a ramp-down switching cycle, the output voltage is relatively low, as a result of which the control means will decide to start a ramp-up switching cycle. After this ramp-up switching cycle the output voltage will be too high, which leads to a ramp-down action in the next switching cycle, etc. During a ramp-up cycle the duty cycle of the converter is increased, whereas during a ramp-down cycle the duty cycle of the converter is decreased.

In a relatively easy to implement embodiment of the invention, the switching means are controlled in accordance with a duty cycle defined by the charging time of the energy storage means divided by the sum of the charging time and the decharging time of the energy storage means, wherein during a ramp-up switching cycle, the duty cycle is increased and wherein during a ramp-down cycle the duty is decreased.

In a yet further embodiment of the invention, the duty cycle is increased by increasing the charging time of the energy storage means and the duty cycle is decreased by increasing the discharging time of the energy storage means.

As an advantage, with the control of the converter according to the present invention, the resolution of the length in time of the first and second phases, i.e. the charging time and discharging time of the energy storage means, may be limited, because the accuracy of the output voltage is, among others, determined by the behaviour in time of the converter. The control according to the invention does not suffer from instabilities.

The invention may be practiced with a plurality of DC/DC converter designs, such as DC/DC up-converters, DC/DC down-converters, DC/DC up/down converters, DC/DC inverting converters, DC/DC converters with positive and negative output, wherein said DC/DC converters may comprise multiple outputs.

The invention also relates to a power supply comprising a DC/DC converter disclosed above, and arranged for receiving an input voltage at input terminals and for providing a controlled output voltage at output terminals of the converter. The DC/DC converter according to the invention is of a particular advantage if applied in an electronical appliance, such as, but not limited to, a portable electronic appliance.

In a preferred embodiment, the switching means comprise semiconductor switching means, in particular MOS (Metallic Oxide Semiconductor) transistor means.

BRIEF DESCRIPTION OF THE DRAWINGS

The invention will now be described in more detail with reference to the accompanying drawings, wherein like reference numerals designate parts having the same or like function.

DETAILED DESCRIPTION OF THE INVENTION

Figure 1:
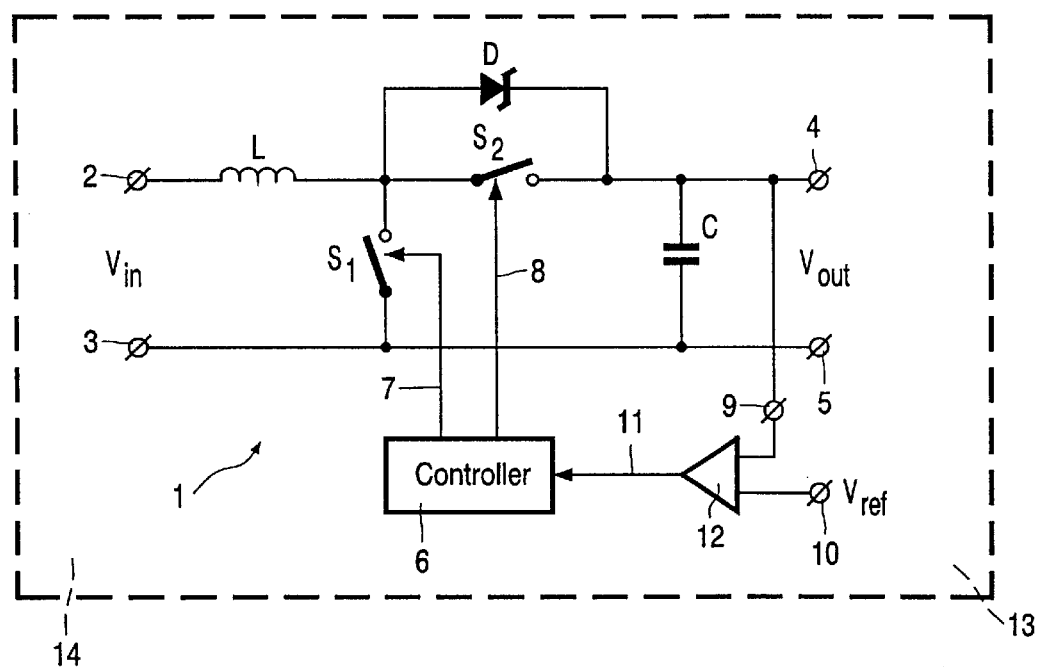
FIG. 1 shows a circuit diagram of a single output DC/DC up-converter comprising control means configured in accordance with the present invention.

FIG. 1 shows a DC/DC converter 1 operated in accordance with the present invention, and having a single output.

The converter 1 comprises inductive electrical energy storage means taking the form of a coil L and first switching means S1, series connected between a first input terminal 2 and a second input terminal 3. The connection of the coil L and the first switching means S1 connects via second switching means S2 to a first output terminal 4. A diode D is parallel connected with the second switching means S2 and provides a current conductive path from the first input terminal 2 to the first output terminal 4. The second input terminal 3 and a second output terminal 5 connect through a common conductive path, for example the earth or mass of an electronic appliance. A smoothing capacitor C connect between the first and second output terminals 4, 5.

The converter 1 is operated to provide a controlled or regulated output voltage Vout at the output 4, 5 in response to an input voltage Vin at the input terminals 2, 3. To this end, a controller or control means 6 are provided for operating the first and second switching means S1 and S2 in accordance with the switching sequence. The control of the first and second switching means S1 and S2 is schematically indicated by arrows 7, 8, respectively.

Comparator means 12 are provided, having a first input terminal 9 connected to the first output terminal 4 of the converter 1, for comparing the output voltage Vout with a reference voltage Vref applied at the second input terminal 10 of the comparator means 12. An output of the comparator means 12 connects to an input of the control means 6, as schematically indicated by arrow 11.

Figure 2:
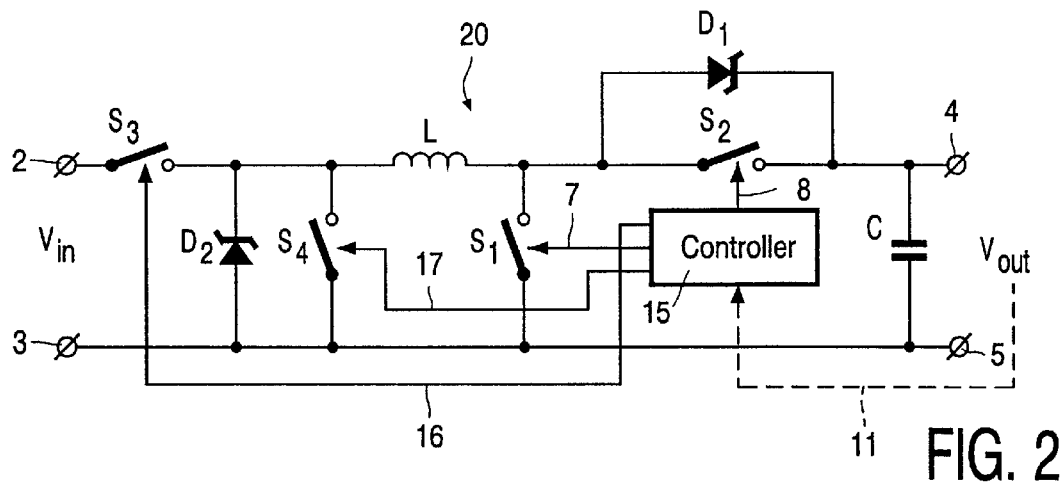
FIG. 2 shows a circuit diagram of a single DC/DC up/down converter, comprising control means configured for operating in accordance with the present invention.

FIG. 2 shows a circuit diagram of an implementation of a DC/DC up/down converter 20, based on the up-converter 1. In addition to the up-converter 1 as shown in FIG. 1, the up/down converter 20 comprises additional third switching means S3 by which the coil L connects to the first input terminal 2, and fourth switching means S4 connecting the coil L to the second input terminal 3 of the converter 20. Further, diode means D2 are parallel connected to the fourth switching means S4, providing a conduction path in forward direction from the second output terminal 5 to the coil L. Control means 15 are provided for controlling the switching means S1, S2, S3 and S4 in accordance with the present invention, as indicated by arrows 7, 8, 16 and 17, respectively.

In a typical conversion cycle of the converter 1 shown in FIG. 1, in a first phase, the switching means S1 are closed, that is in a current conductive state, and the switching means S2 are open, that is in a non-current conductive state. During this first phase, current flows only through the coil L storing electrical energy therein.

During a second phase, subsequent to the first phase, the switching means S1 are open and the switching means S2 are closed. In this phase energy built up in the coil L is provided at the output terminals 4, 5 resulting in an output voltage Vout which is higher than the input voltage Vin.

In a typical conversion cycle of the converter 20, during a first phase, the first switching means S1 and the third switching means S3 are in a conductive state and the second switching means S2 and the fourth switching means S4 are in a non-conductive state. During this first phase, energy is stored in the coil L.

In a second phase of the switching sequence, the first switching means S1 and the fourth switching means S4 are in a non-conductive state and the second switching means S2 and the third switching means S3 are in a conductive state. During this phase, the coil current remains stable and energy is transferred to the output terminals 4, 5, resulting in an output voltage Vout.

In a third phase, the first switching means S1 and the third switching means S3 are in a non-conductive state and the second switching means S2 and the fourth switching means S4 are in a conductive state. In this phase, the coil current decreases, because no energy is supplied thereto from the input, while energy is transferred to the output.

By controlling the amount of energy supplied to the coil L the output voltage Vout can be higher than the input voltage Vin, i.e. the up-conversion mode, or the output voltage Vout can be less than the input voltage Vin, i.e. the down-conversion mode of the converter 20.

Figure 3:
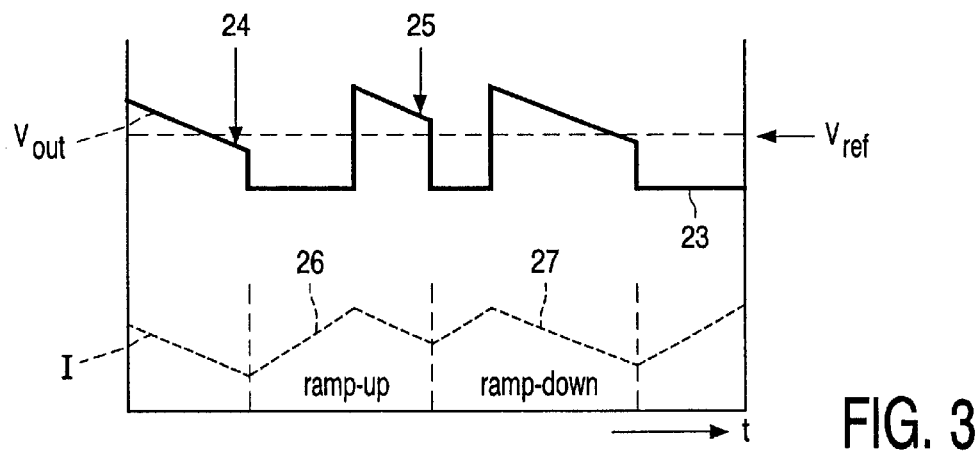
FIG. 3 shows in a graphic representation, the output voltage and the coil current in the DC/DC up-converter of FIG. 1.

FIG. 3 shows the output voltage Vout against the time t and the coil current I against the time t in a typical switching cycle in a Pulse Width Modulation (PWM) conversion.

As can be seen from FIG. 3, the output voltage Vout contains a ripple 23.

This ripple 23 in the output voltage is caused by the energy delivered to a load connected across the output terminals 4, 5 of the converter 1, and by the charging and uncharging of the output capacitor C, because the coil current I flows through the Equivalent Series Resistance (ESR) of the capacitor C, as a result of which the output voltage Vout depicts the amplitude of the coil current I.

The output voltage Vout is determined by the duty cycle D of the converter (PWM mode) which duty cycle D is defined by the ratio of the charging time of the coil L and the sum of the charging time and the discharging time of the coil L:

wherein:
$D = t1/(t1+t2) = t1/T$
$t1$ = time in which energy is stored in the coil L;
$t2$ = time in which energy is transferred to the output terminals, and
$T = t1+t2$.

For the up-converter 1 shown in FIG. 1 without a load connected to the output terminals 4, 5 thereof, the ratio between the output voltage Vout and the input voltage Vin equals 1−D=t2/T.

The control means 6, 15 are configured as digital control means, such that the on and off times of the switches S1–S4, i.e. the time in which the switches are in their current conductive state or in their non-conductive state; can only can be varied in discrete steps, dependent on a clock frequency $f_{ck}$ and a switching frequency $f_{sw}$ derived from the clock frequency: $f_{sw}=f_{ck}/N$, wherein N>1.

Accordingly, the duty cycle may only vary in discrete steps, such that it can be difficult and even impossible to provide an exact output voltage from an unknown input voltage.

In accordance with the present invention, if at the sample moment 24, at which the output voltage Vout is compared with the reference voltage Vref, it turns out that the output voltage Vout is below the reference voltage Vref, a ramp-up switching cycle is started, wherein the first phase t1 is increased, in such a manner that the coil current I during the ramp-up switching cycle, indicated by reference numeral 26 in FIG. 3, is clearly increased. However, at the next sample moment 25 it can be seen from FIG. 3 that the output voltage Vout is above the reference voltage Vref, such that, in accordance with the invention, a ramp-down switching cycle 27 is initiated, in which the second phase t2 is enlarged, resulting in a substantially decreased coil current.

The factor by which the charging and the decharging times are increased respectively. Decreased, depends among others, on the value of the coil L and the capacitor C.

The length of the switching times in a ramp-up or ramp-down cycle are determined from the duty cycle of the converter. This guarantees that the coil current I will always change in a desired direction, even if there is a large or very small difference between the input and output voltages.

By the ramp-up 26 and the ramp-down 27 switching cycles of the present invention, the output voltage will vary around its desired level, i.e. Vref. To this end, in a stable situation, the control according to the present invention will alternatively provide a ramp-up and ramp-down switching cycle, if there is a larger difference between the actual output voltage and the desired level then, by a plurality of cycles of the same time, the coil current will be increased to a desired level and the duty cycle will be adapted to this new situation.

With the control algorithm according to the present invention, the problem of discrete values of the duty cycle has been efficiently solved, in that the output voltage Vout varies in a clear manner around the reference voltage Vref.

Adaptation of the duty cycle can be realized in a ramp-up switching cycle by increasing the length in time of the first phase t1 whereas a ramp-down switching cycle can be realized by increasing the length in time of the second phase t2. However, it is also possible to control the ramp-up and ramp-down cycles by keeping the sum of t1 and t2 constant and by adapting t1 and t2 simultaneously, in a manner that the coil current will substantially increase during a ramp-up cycle and will substantially decrease during a ramp-down cycle.

Figure 4:
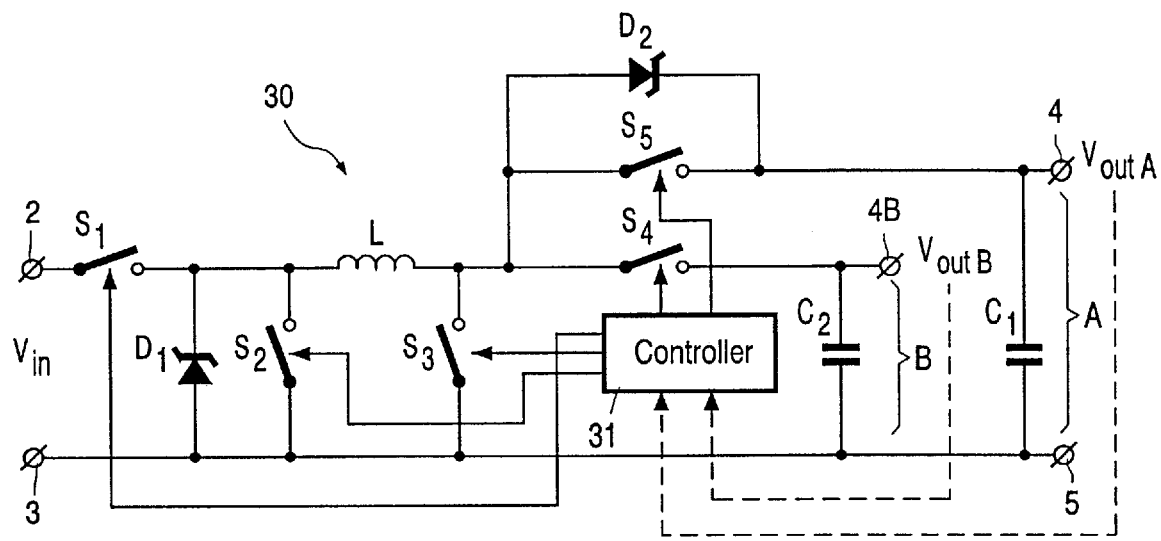
FIGS. 4, 5, 6 and 7 show, in a circuit diagram representation, embodiments of DC/DC converters, comprising control means in accordance with the present invention.

The control algorithm according to the present invention can be practised with a large variety of DC/DC converters, such as a multi-output DC/DC up/down-converter 30 as shown in FIG. 4 having two outputs A, B and digital control means 31 arranged for operating the converter 30 in accordance with the control principle of the present invention, as outlined above.

Figure 5:
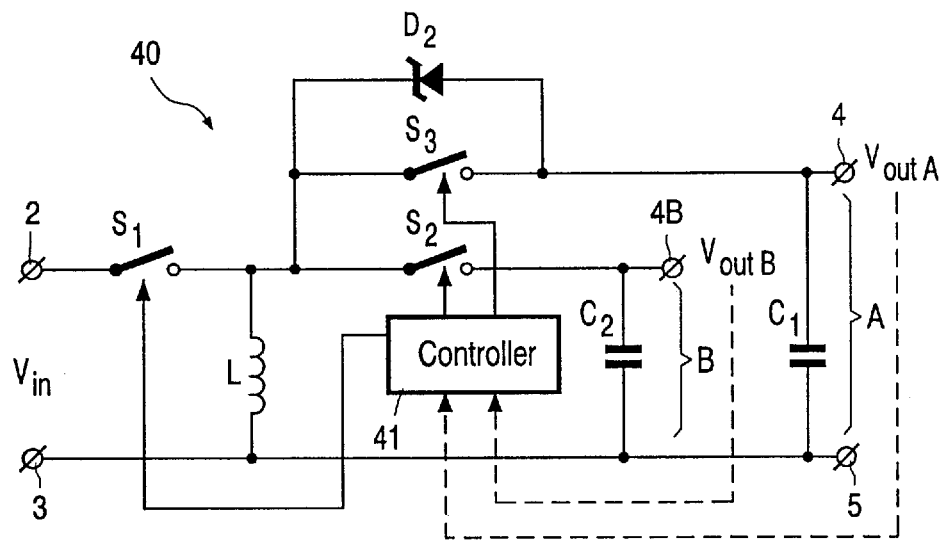

FIG. 5 is a circuit diagram of a multi-output DC/DC inverting converter 40 having to output A, B providing an negative output voltage compared to the input voltage Vin and having digital control means 41, configured for operation in accordance with the present invention.

Figure 6:
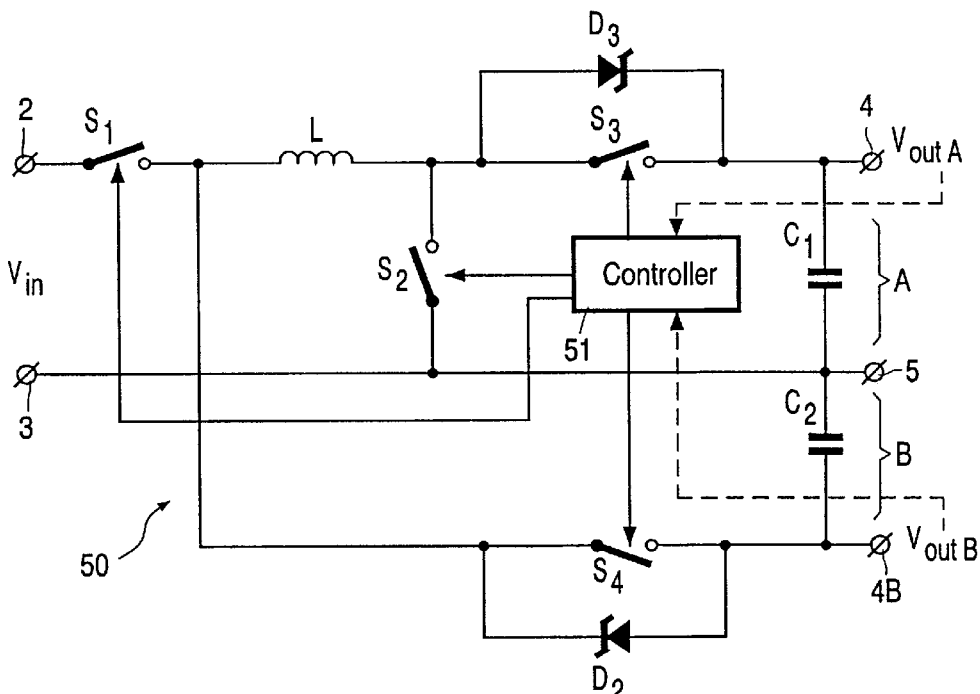

FIG. 6 shows a circuit diagram of a multi-output DC/DC converter 50, having a positive output A and negative output B and digital control means 51, operated in accordance with the present invention.

Figure 7:
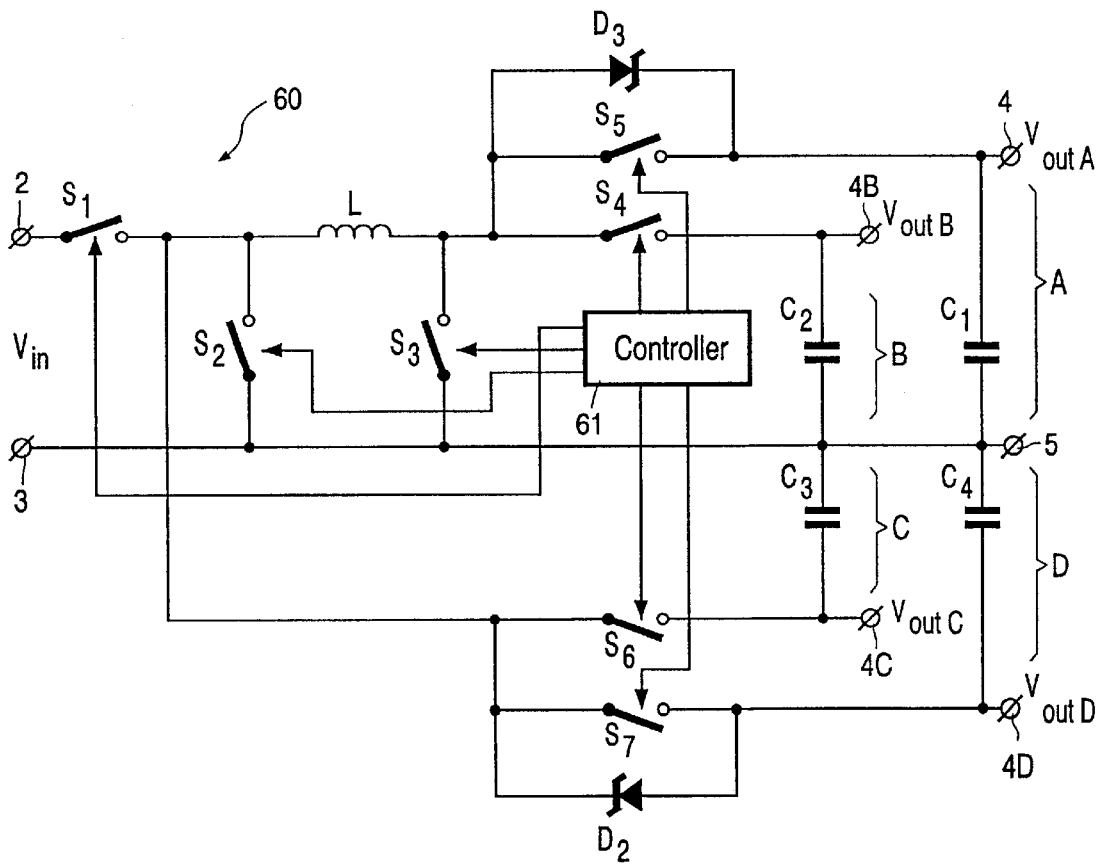

FIG. 7 shows a circuit diagram of a multi-output DC/DC up/down converter 60, having two positive outputs A and B and two negative outputs C and D at output terminals 4, 4b, 4c, 4d, respectively, and digital control means 61 configured in accordance with the present invention.

Those skilled in the art will appreciate that in the DC/DC converter 1, for example, the switching means S1 can be omitted and replaced by the diode D. However, to increase the power conversion efficiency of the DC/DC converter 1, use of separate switching means are preferred to avoid a relatively large voltage drop across the diode.

The DC/DC converter operating in accordance with the principle of the present invention may be used with or in an electronic appliance, such as a portable electronic appliance, or arranged to form a separate power supply, schematically indicated by blocks 11 and 12, respectively in FIG. 1.

In an integrated semiconductor design of the DC/DC converter according to the present invention, the switching means are comprised by MOS (Metallic Oxide Semiconductor) transistor means.

What is claimed is:

1. DC/DC converter (1; 20), comprising inductive electrical energy storage means (L), switching means (S1–S4) and control means (6; 15) wherein said control means (6; 15) are arranged for selectively operating said switching means (S1–S4) for transferring an amount of electrical energy from said energy storage means (L) to an output of said DC/DC converter (1; 20), for providing a desired output voltage (Vout), characterized by digital control means (6; 15) which are configured for operatively controlling said switching means (S1–S4) for transferring electrical energy in accordance with a switching sequence comprising one of:
   a ramp-up switching cycle for substantially charging the energy storage means (L); and
   a ramp-down switching cycle for substantially dicharging the energy storage means (L).

2. A DC/DC converter (1; 20) according to claim 1, wherein said control means (6; 15) are arranged for comparing said output voltage (Vout) with a reference voltage, and wherein said switching means (S1–S2) are controlled such that if said output voltage (Vout) is below said reference voltage (Vref), a ramp-up switching cycle is used as a next switching cycle, and if said output voltage (Vout) is higher than said reference voltage (Vref) a ramp-down switching cycle is used as a next switching cycle.

3. A DC/DC converter (1; 20) according to claim 1, wherein said control means (6; 15) are arranged for controlling said output voltage (Vout) in a Pulse Width Modulation (PWM) mode switching cycle.

4. A DC/DC converter (1; 20) according to claim 3, wherein said switching means (S1–S4) are controlled in accordance with a duty cycle defined by the charging time of the energy storage means divided by the sum of the charging time and the discharging time of the energy storage means, wherein during a ramp-up switching cycle the duty cycle is increased and wherein during a ramp-down cycle the duty cycle is decreased.

5. A DC/DC converter (1; 20) according to claim 4, wherein the duty cycle in increased by increasing the charging time of the energy storage means (L) and wherein the duty cycle is decreased by increasing the discharging time of the energy storage means.

6. A DC/DC converter (1; 20) according to claim 4, wherein said control means (6; 15) are arranged for increasing and decreasing said duty cycle keeping the sum of the charging and the discharging time of the energy storage means (L) constant.

7. A DC/DC converter (1; 20) according to claim 1, comprising at least one of a group including DC/DC up-converters, DC/DC down-converters, DC/DC up/down converters, DC/DC inverting converters, DC/DC converters with positive and negative output, wherein said DC/DC converters may comprise multiple outputs.

8. A power supply comprising a DC/DC converter (1; 20) according to claim 1, arranged for receiving an input voltage (Vin) at input terminals (2, 3) and for providing a controlled output voltage (Vout) at output terminals (4, 5) of said power supply (14).

9. An electronic appliance comprising a DC/DC converter (1; 20) according to claim 1.

10. A voltage regulating converter, comprising:
   an electrical energy storage device coupled to a voltage source;
   one or more switches selectively connecting the storage device to a load;
   a controller controlling the one or more switches to produce a pulsed direct current signal having a desired maximum voltage level utilizing at least one of a ramp-up switching cycle for cumulatively charging the energy storage device each cycle and a ramp-down switching cycle for cumulatively discharging the energy storage device each cycle.

11. The voltage regulating converter according to claim 10, wherein the ramp-up switching cycle and the ramp-down switching cycle having substantially equal durations but different duty cycles for a given pulse width.

12. The voltage regulating converter according to claim 10, wherein the pulsed direct current signal is a pulse width modulated (PWM) signal.

13. The voltage regulating converter according to claim 10, wherein a total cycle duration of the pulsed direct current signal may be selectively altered by the controller.

14. The voltage regulating converter according to claim 10, wherein the controller compares a maximum voltage level of the pulsed direct current signal to a reference voltage level and selects one of the ramp-up switching cycle and the ramp-down switching cycle based upon the comparison.

15. The voltage regulating converter according to claim 14, wherein the controller selects the ramp-up switching cycle when the maximum voltage level of the pulsed direct current signal is below the reference voltage level, and wherein the controller selects the ramp-down switching cycle when the maximum voltage level of the pulsed direct current signal is above the reference voltage level.

16. A method of regulated voltage conversion, comprising:
   selectively connecting an electrical energy storage device coupled to a voltage source to a load; and
   controlling connection of the electrical energy storage device to the load to produce a pulsed direct current signal having a desired maximum voltage level utilizing at least one of a ramp-up switching cycle for cumulatively charging the energy storage device each cycle and a ramp-down switching cycle for cumulatively discharging the energy storage device each cycle.

17. The method according to claim 16, wherein the ramp-up switching cycle and the ramp-down switching cycle having substantially equal durations but different duty cycles for a given pulse width.

18. The method according to claim 16, wherein the pulsed direct current signal is a pulse width modulated (PWM) signal.

19. The method according to claim 16, wherein a total cycle duration of the pulsed direct current signal may be selectively altered by the controller.

20. The method according to claim 16, further comprising:
   comparing a maximum voltage level of the pulsed direct current signal to a reference voltage level and selects one of the ramp-up switching cycle and the ramp-down switching cycle based upon the comparison, selecting the ramp-up switching cycle when the maximum voltage level of the pulsed direct current signal is below the reference voltage level and the ramp-down switching cycle when the maximum voltage level of the pulsed direct current signal is above the reference voltage level.

* * * * *